US005195212A

United States Patent [19]

Colwell

[11] Patent Number: 5,195,212

[45] Date of Patent: Mar. 23, 1993

[54] TOOL HANDLE COVER

[76] Inventor: Lori A. Colwell, 304 N. 12th, Apt. 4, Norfolk, Nebr. 68701

[21] Appl. No.: 781,400

[22] Filed: Oct. 23, 1991

[51] Int. Cl.[5] .................... B65G 7/12

[52] U.S. Cl. .................... 16/114 R; 16/116 R; 16/DIG. 12; 294/26

[58] Field of Search .......... 16/114 R, 116, A, 116 R, 16/DIG. 12, 119, 120; 7/167; 81/177.1, 489; 30/164.5, 125, 313, 314, 335, 337, 136.5; 294/17, 26; D99/35-37; 173/162.2; 74/551.9

[56] References Cited

U.S. PATENT DOCUMENTS

| | | | |
|---|---|---|---|
| 1,176,583 | 3/1916 | McPhee | 16/116 R |
| 1,484,495 | 2/1924 | Hatherley | 294/26 |
| 2,050,176 | 8/1936 | Hammerich | 16/DIG. 12 |
| 2,274,605 | 2/1942 | Hoffmeister | 16/DIG. 12 |
| 3,531,148 | 9/1970 | Rohde | 294/26 |
| 3,752,202 | 8/1973 | Condon | 81/177.1 |
| 4,262,385 | 4/1981 | Norman | 16/114 R |
| 4,722,296 | 2/1988 | Bowskill | 16/114 R |
| 5,033,142 | 7/1991 | Templeton | 7/116 |

*Primary Examiner*—Robert L. Spruill
*Assistant Examiner*—Donald M. Gurley
*Attorney, Agent, or Firm*—Zarley, McKee, Thomte, Voorhees & Sease

[57] ABSTRACT

A tool handle cover includes a sheet having a pair of opposing slots formed therein which are juxtaposed to form an opening through which the shaft of a hook implement will project as the sheet is wrapped around the handle thereof.

2 Claims, 2 Drawing Sheets

TOOL HANDLE COVER

TECHNICAL FIELD

The present invention relates generally to covers for handles on tools, and more particularly to an improved cover which may be removably mounted on the handle of a knife, hook, or the like.

BACKGROUND OF THE INVENTION

In the meat packing industry, knives, hooks, and other tools are utilized in the processing of meat products. Because the tools are used with a highly repetitive motion, carpal tunnel syndrome has become an increasingly common occurrence, causing worker absenteeism and disability in serious cases. This syndrome is believed to be caused by the repetitive dynamic forces applied to the arms during the repetitive process required in using knives, hooks and similar tools.

It is therefore a general object of the present invention to provide a cover for knives, hooks and similar tools which dampens dynamic forces transmitted by the tools and thereby reduces the occurrence of carpal tunnel syndrome.

Yet another object of the present invention is to provide a cover for the handles of knives, hooks and similar tools which is easily connected and removed from the tool handles.

Still another object is to provide a handle cover which is simple to manufacture, easy to use, and refined in appearance.

These and other objects of the present invention will be apparent to those skilled in the art.

SUMMARY OF THE INVENTION

The tool handle cover of the present invention includes a sheet of resilient cushioning material releasably fastened around the handle of the tool. In one embodiment of the invention the sheet is formed as a hollow tube with a rigid disk-shaped cover at one end having a slot therethrough to receive a knife blade. The opposite end of the tube has an operable cover which will maintain the handle of the knife within the tube. In a second embodiment of the invention the sheet has a pair of opposing slots formed therein which are juxtaposed to form an opening through which the shaft of a hook implement will project as the sheet is wrapped around the handle.

DESCRIPTION OF THE PREFERRED EMBODIMENTS

Figure 1:
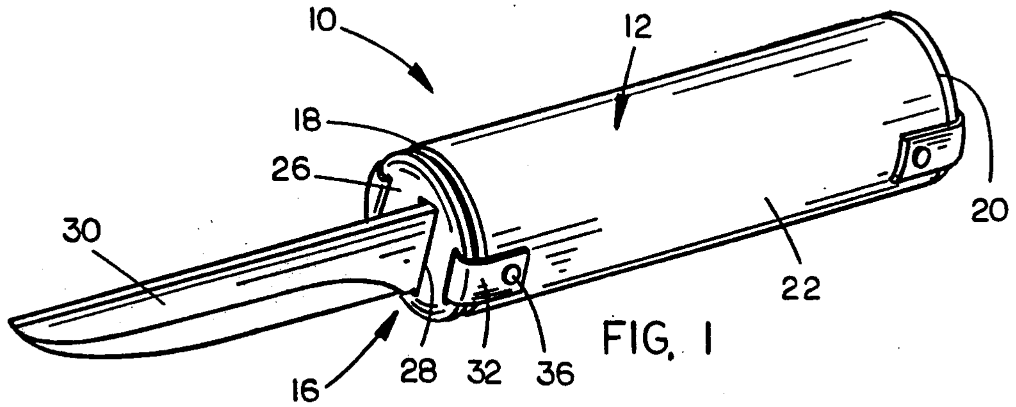
FIG. 1 is a perspective view of a first embodiment of the invention mounted on a knife handle.
Figure 2:
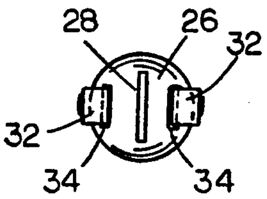
FIG. 2 is a front view of the invention shown in FIG. 1.
Figure 3:
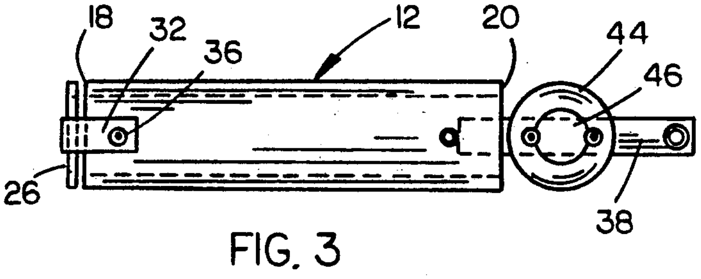
FIG. 3 is a side elevational view of the invention of FIG. 1.

Referring now to the drawings, in which similar or corresponding parts are identified with the same reference numeral, and more particularly to FIG. 1, the handle cover of the present invention is designated generally at 10 and includes a sheet of foam material 12 wrapped around the handle 14 of a knife 16.

Figure 4:
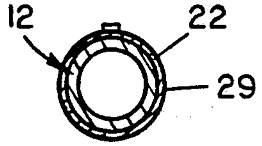
FIG. 4 is a sectional view taken at lines 4—4 in FIG. 5.

Foam sheet 12 is preferably formed of a closed cell foam material and formed in a hollow cylindrical tubular shape having a forward edge 18 a rearward edge 20 and an exterior cylindrical surface 22. The exterior surface 22 of foam sheet 12 may be coated with a rubber material so as to form a water impervious coating 24 (as shown in FIGS. 4 and 6).

Figure 6:
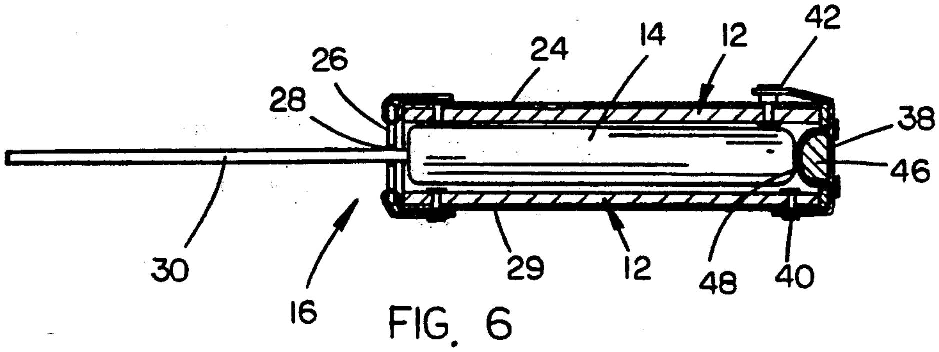
FIG. 6 is a longitudinal horizontally oriented sectional view taken through the device of FIG. 1.

A rigid plastic disk 26 is provided with a slot 28 through which the knife blade 30 will extend, as shown in FIGS. 1 and 6. Disk 26 is held in position perpendicular to the longitudinal axis of tube 12 by a pair of nylon straps 32 looped through diametric slots 34 in disk 26, and fastened to diametric sides of tube 12 by rivets 36 or the like.

Figure 5:
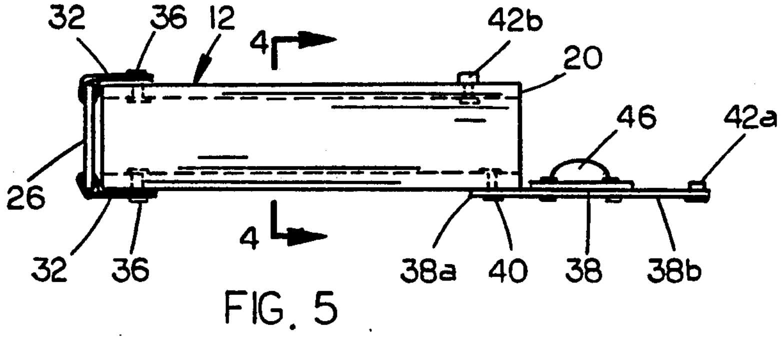
FIG. 5 is a top elevational view of the invention shown in FIG. 1.

An elongated nylon strap 38 has one end **38*a* attached to tube 12 adjacent rearward edge 20 by a rivet 40 or the like. The opposite end 38*b* of strap 38 has one-half 42*a* of a snap fastener attached thereto which corresponds with a second half 42*b* of a snap fastener mounted diametric to rivet 40 on tube 12, as shown in FIG. 5**.

A disk-shaped piece of foam material 44 is mounted to strap 38 intermediate the ends thereof so as to form a cover for the rearward end of tube 12. A projecting generally semi-spherical pad of foam material 46 projects from the center of disk 44 to contact the rearward end of the knife handle 14, as shown in FIG. 6. A rubber coating 48 may be applied to pad 46, as shown in FIG. 6.

In use, a knife 16 is inserted into tube 12 by disconnecting snap **42*a* and 42*b* to open up the rearward end of tube 12. Blade 30 will extend through slot 28 in disk 26, and tube 12 will snugly retain handle 14 therein. Strap 38 is then positioned at the rear handle 14 and applies pressure via foam pad 46, when snap 42 is fastened. Handle cover 10 thereby foams a soft and resilient cover which dampens dynamic impacts on the hand and arm during use of the knife 16**.

Figure 7:
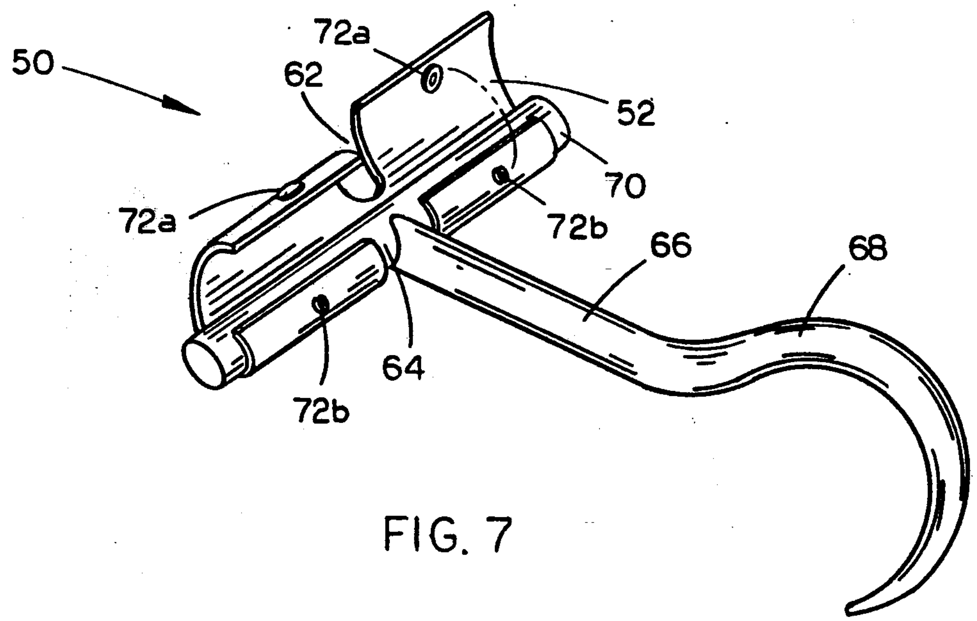
FIG. 7 is a perspective view of a second embodiment of the invention partially installed on a hook.
Figure 8:
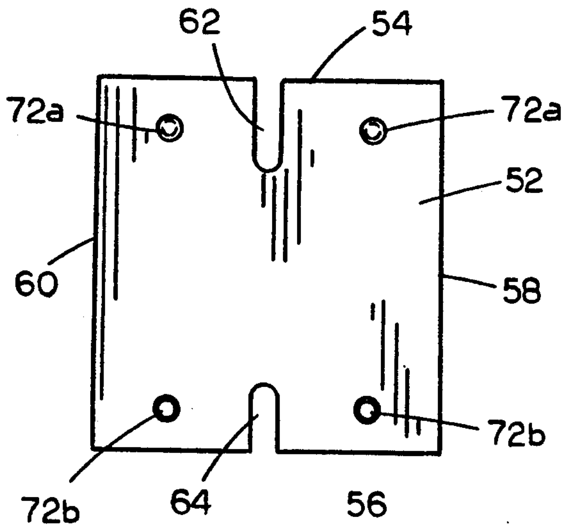
FIG. 8 is a plan view of the second embodiment of the invention.

A second embodiment of the invention is designated generally at 50 in FIG. 7, and includes a generally rectangular sheet 52 of foam material similar to tube 12 of the first embodiment 10 of the invention. Sheet 52 includes first and second opposing parallel edges 54 and 56, and opposing side edges 58 and 60, as shown in FIG. 8. A first slot 62 is cut into first edge 54 generally centered between side edges 58 and 60. A second slot 64 is cut into second edge 56 directly opposite slot 62. As shown in FIG. 7, slots 62 and 64 will receive the shaft 66 of a hook member 68 when sheet 52 is wrapped around the hook handle 70.

One-half **72*a* of a snap fastener is mounted on opposite sides of slot 62 adjacent first edge 54, with the corresponding second half 72*b* mounted on opposite sides of slot 64 adjacent second edge 56. In this way, sheet 52 is fastened on handle 70 by connecting fastener halves 72*a* and 72*b* with sheet 52 wrapped around handle 70**.

Figure 9:
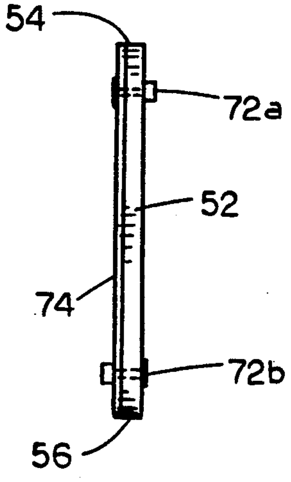
FIG. 9 is a side elevational view of the invention of FIG. 8.
Figure 10:
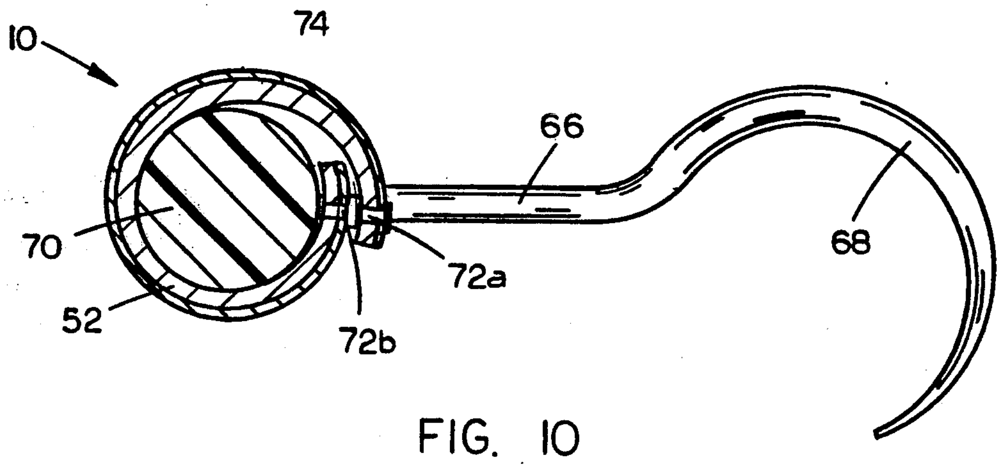
FIG. 10 is a transverse sectional view through the handle of the book of FIG. 7.

Referring now to FIGS. 9 and 10, a rubber coating 74 is preferably applied to the exterior face of sheet 52 to form a water impervious coating which is easily gripped when mounted on handle 70. As with the first embodiment, handle cover 50 serves to dampen and cushion the hand when hook member 68 is repetitively utilized.

Whereas the invention as been shown and described in connection with the preferred embodiments thereof, it will be understood that many modifications, substitutions and additions may be made which are within the intended broad scope of the appended claims. There has therefore been shown and described an improved handle cover which accomplishes at least all of the above stated objects.

I claim:

1. A cover for the handle of a tool, comprising:

a sheet of resilient cushioning material; and means for removably fastening the sheet to the handle of a tool; said sheet being generally rectangular with first and second opposing parallel edges, first and second opposing parallel side edges, a front surface and a back surface; and said means for fastening the sheet to a handle including one-half of cooperable fastener means mounted on the front face of said sheet adjacent the first edge, and a second half of the cooperable fastener mounted on the back surface of the sheet adjacent the second edge, such that said first and second halves will cooperably fasten when said sheet is wrapped around the handle with the first edge overlapping the second edge;

a first slot formed in the first edge extending towards the second edge; and a second slot in the second edge opposite the first slot;

said slots juxtaposed to form an opening through said sheet when wrapped around the handle of a tool.

2. In combination:

a tool having a handle and an implement projecting from the handle;

a sheet of resilient cushioning material wrapped around said handle; and means for removably fastening said sheet to said handle;

said handle being elongated and having a longitudinal exterior surface and opposing first and second transverse ends; and said implement having a shaft projecting perpendicularly from the longitudinal exterior surface of the handle approximately midway between the first and second ends;

said sheet being generally rectangular with first and second opposing parallel edges, first and second opposing parallel side edges, a front surface and a back surface;

a first slot formed in the first edge extending towards the second edge;

a second slot formed in the second edge opposite the first slot;

said sheet wrapped around the longitudinal exterior surface of said handle with the front surface of said sheet in contact with the exterior surface of the handle and the first slot oriented to receive said shaft therethrough;

said second edge overlapping the first edge with said second slot juxtaposed to receive said shaft therethrough;

said means for fastening the sheet to said handle including one-half of the cooperable fastener means mounted on the front face of said sheet adjacent the first edge, and a second half of a cooperable fastener mounted on the back surface of the sheet adjacent the second edge, said first and second halves of said fastener located so as to cooperably engage when the sheet is wrapped around the handle with the first edge overlapping the second edge.

* * * * *